(12) United States Patent
Bernal et al.

(10) Patent No.: US 9,865,056 B2
(45) Date of Patent: Jan. 9, 2018

(54) VIDEO BASED METHOD AND SYSTEM FOR AUTOMATED SIDE-BY-SIDE DRIVE THRU LOAD BALANCING

(71) Applicant: Xerox Corporation, Norwalk, CT (US)

(72) Inventors: Edgar A. Bernal, Webster, NY (US); Aaron Michael Burry, Ontario, NY (US); Orhan Bulan, Webster, NY (US)

(73) Assignee: CONDUENT BUSINESS SERVICES, LLC, Dallas, TX (US)

( * ) Notice: Subject to any disclaimer, the term of this patent is extended or adjusted under 35 U.S.C. 154(b) by 84 days.

(21) Appl. No.: 15/015,768

(22) Filed: Feb. 4, 2016

(65) Prior Publication Data

US 2016/0155328 A1 Jun. 2, 2016

Related U.S. Application Data

(63) Continuation-in-part of application No. 14/050,041, filed on Oct. 9, 2013, now Pat. No. 9,361,690.

(51) Int. Cl.

| G06K 9/00 | (2006.01) |
|---|---|
| G06T 7/00 | (2017.01) |
| G06Q 10/00 | (2012.01) |
| G08G 1/015 | (2006.01) |
| G08G 1/017 | (2006.01) |
| G08G 1/04 | (2006.01) |
| G08G 1/065 | (2006.01) |
| G08G 1/095 | (2006.01) |
| G07C 11/00 | (2006.01) |
| G08G 1/02 | (2006.01) |

(Continued)

(52) U.S. Cl.
CPC ........ *G06T 7/0022* (2013.01); *G06K 9/00785* (2013.01); *G06Q 10/00* (2013.01); *G07C 11/00* (2013.01); *G08G 1/015* (2013.01); *G08G 1/0175* (2013.01); *G08G 1/04* (2013.01); *G08G 1/065* (2013.01); *G08G 1/095* (2013.01); *G06T 2207/30236* (2013.01); *G08G 1/02* (2013.01); *G08G 1/042* (2013.01); *G08G 1/096716* (2013.01); *G08G 1/096783* (2013.01)

(58) Field of Classification Search
CPC ............. G06K 9/00785; G06K 9/6267; G06K 9/00711; G06K 9/00771; G06K 9/00791; G06K 9/4609; G06K 9/6212; G06T 2207/30236; G06T 2207/20081; G06T 7/246; G06Q 30/0635; G08G 1/015
See application file for complete search history.

(56) References Cited

U.S. PATENT DOCUMENTS

| 5,163,000 A | 11/1992 | Rogers et al. |
|---|---|---|
| 5,678,335 A | 10/1997 | Gomi |
| 6,842,719 B1 | 1/2005 | Fitzpatrick |

(Continued)

*Primary Examiner* — Bhavesh Mehta
*Assistant Examiner* — Ian Lemieux

(57) ABSTRACT

A method, non-transitory computer readable medium, and apparatus for directing a vehicle in a side-by-side drive-thru are disclosed. For example, the method receives one or more video images of a side-by-side drive-thru comprising two or more lanes, detects a vehicle approaching an entrance of the side-by-side drive-thru, calculating an estimated order time for the vehicle and directs the vehicle to one of the two or more lanes based on the estimated order time for the vehicle or a previously estimated order time of each one of the a plurality of vehicles already in the first lane and the second lane of the drive-thru.

15 Claims, 4 Drawing Sheets

(51) Int. Cl.
  *G08G 1/042* (2006.01)
  *G08G 1/0967* (2006.01)

(56) References Cited

U.S. PATENT DOCUMENTS

| | | | |
|---|---|---|---|
| 7,508,956 B2 * | 3/2009 | Scheppmann | G06K 9/00785 |
| | | | 348/148 |
| 8,254,625 B2 | 8/2012 | Coulter et al. | |
| 2005/0033505 A1 | 2/2005 | Zatz | |
| 2005/0073434 A1 | 4/2005 | Arquette | |
| 2008/0120880 A1 | 5/2008 | Stadjuhar | |
| 2011/0258011 A1 | 10/2011 | Burns et al. | |
| 2013/0138515 A1 * | 5/2013 | Taniguchi | G06Q 30/0635 |
| | | | 705/15 |
| 2014/0258062 A1 | 9/2014 | Calman et al. | |
| 2015/0054957 A1 | 2/2015 | Gross et al. | |
| 2015/0070471 A1 | 3/2015 | Loce | |

* cited by examiner

VIDEO BASED METHOD AND SYSTEM FOR AUTOMATED SIDE-BY-SIDE DRIVE THRU LOAD BALANCING

CROSS-REFERENCE TO RELATED APPLICATIONS

This application is a continuation-in-part of co-pending U.S. patent application Ser. No. 14/050,041, filed on Oct. 9, 2013, which is herein incorporated by reference in its entirety.

The present disclosure relates generally to management of traffic loads and, more particularly, to a video-based method and system for automatically directing a vehicle to a lane of a side-by-side drive-thru.

BACKGROUND

Due to increased customer throughput relative to traditional drive-thru configurations, fast food restaurants are adopting a side-by-side drive-thru configuration. While the side-by-side drive-thru has benefits regarding the maximum drive-thru customer per hour rate a restaurant can achieve, it presents new challenges to restaurants.

One example of a problem of the side-by-side drive-thru presents is potential for imbalance in the lanes as one lane may contain a larger number of vehicles than another lane for a variety of reasons. Alternatively, one lane may appear to have fewer vehicles, but have a longer service time due to having to fulfill more, or larger, orders per vehicle than another lane.

Presently, to address these new challenges, managers may deploy an employee to go outside to manually manage the drive-thru lanes. However, deploying an employee to go outside to manually manage the drive-thru lanes lowers productivity from the restaurant as one fewer employee is available to take orders, prepare food, complete orders, and the like.

SUMMARY

According to aspects illustrated herein, there are provided a method, a non-transitory computer readable medium, and an apparatus for directing a vehicle to a lane of a side-by-side drive-thru. One disclosed feature of the embodiments is a method that receives one or more video images of a side-by-side drive-thru comprising two or more lanes, detects a vehicle approaching an entrance of the side-by-side drive-thru, calculates an estimated order time for the vehicle and directs the vehicle to one of the two or more lanes based on the estimated order time for the vehicle or a previously estimated order time of each one of a plurality of vehicles already in the first lane and the second lane of the drive-thru.

Another disclosed feature of the embodiments is a non-transitory computer-readable medium having stored thereon a plurality of instructions, the plurality of instructions including instructions which, when executed by a processor, cause the processor to perform operations that receive one or more video images of a side-by-side drive-thru comprising two or more lanes, detect a vehicle approaching an entrance of the side-by-side drive-thru, calculate an estimated order time for the vehicle and direct the vehicle to one of the two or more lanes based on the estimated order time for the vehicle or a previously estimated order time of each one of a plurality of vehicles already in the first lane and the second lane of the drive-thru.

Another disclosed feature of the embodiments is an apparatus comprising a processor and a computer readable medium storing a plurality of instructions which, when executed by the processor, cause the processor to perform operations that receive one or more video images of a side-by-side drive-thru comprising two or more lanes, detect a vehicle approaching an entrance of the side-by-side drive-thru, calculate an estimated order time for the vehicle and direct the vehicle to one of the two or more lanes based on the estimated order time for the vehicle or a previously estimated order time of each one of a plurality of vehicles already in the first lane and the second lane of the drive-thru.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for directing a vehicle to a lane of a side-by-side drive-thru. Although the examples described herein relate to a drive-thru, the present disclosure may be broadly applied to any vehicular or pedestrian traffic scenario that has a side-by-side configuration where a service is provided, or a process is fulfilled, with potentially varying service or process times across different lanes or different lines of customers. As discussed above, the side-by-side drive-thru configuration presents new challenges to restaurants.

One example of a new problem of the side-by-side traffic, e.g., a side-by-side drive-thru, is a potential for imbalance in the lanes as one lane may contain a larger number of vehicles than other lanes for a variety of reasons. For example, vehicles may have a tendency to favor an inner lane because they are unfamiliar with the side-by-side configuration or other reasons. In some cases, restaurants may choose to place dense shrubbery in the median between drive-thru lanes for aesthetical purposes, which may prevent customers from accurately evaluating traffic on the opposite lane. Additionally, menu and order boards can also affect visibility of opposite lanes.

As a result, the main lane may appear to be artificially congested due to an imbalance farther down the drive-thru path where the main lane splits into the side-by-side order lanes. In this case, customers may drive by the restaurant even though one of the lanes may be empty or may be operating at less than full capacity. Alternatively, customers may drive out of the lane if one lane is taking much longer than the other lane. Drive-thru imbalance also may lead to a perception of lack of customer equity when vehicles drive past the line and enter a drive-thru lane that turns out to have available space and/or to be moving faster.

One embodiment of the present disclosure provides automated load balancing of a drive-thru having a side-by-side configuration to improve customer satisfaction and customer retention. For example, the embodiments of the present disclosure may provide balancing based on a drive-thru order time. In one embodiment, order time may refer to the actual time to place the order. In another embodiment, the order time may refer to a service time or a wait time. In other words, order time may be defined as one or more of the following when discussed below: time to wait to place an order, time to place the order, time for food preparation for a given order, time to wait to receive an order, and the like.

Figure 1:
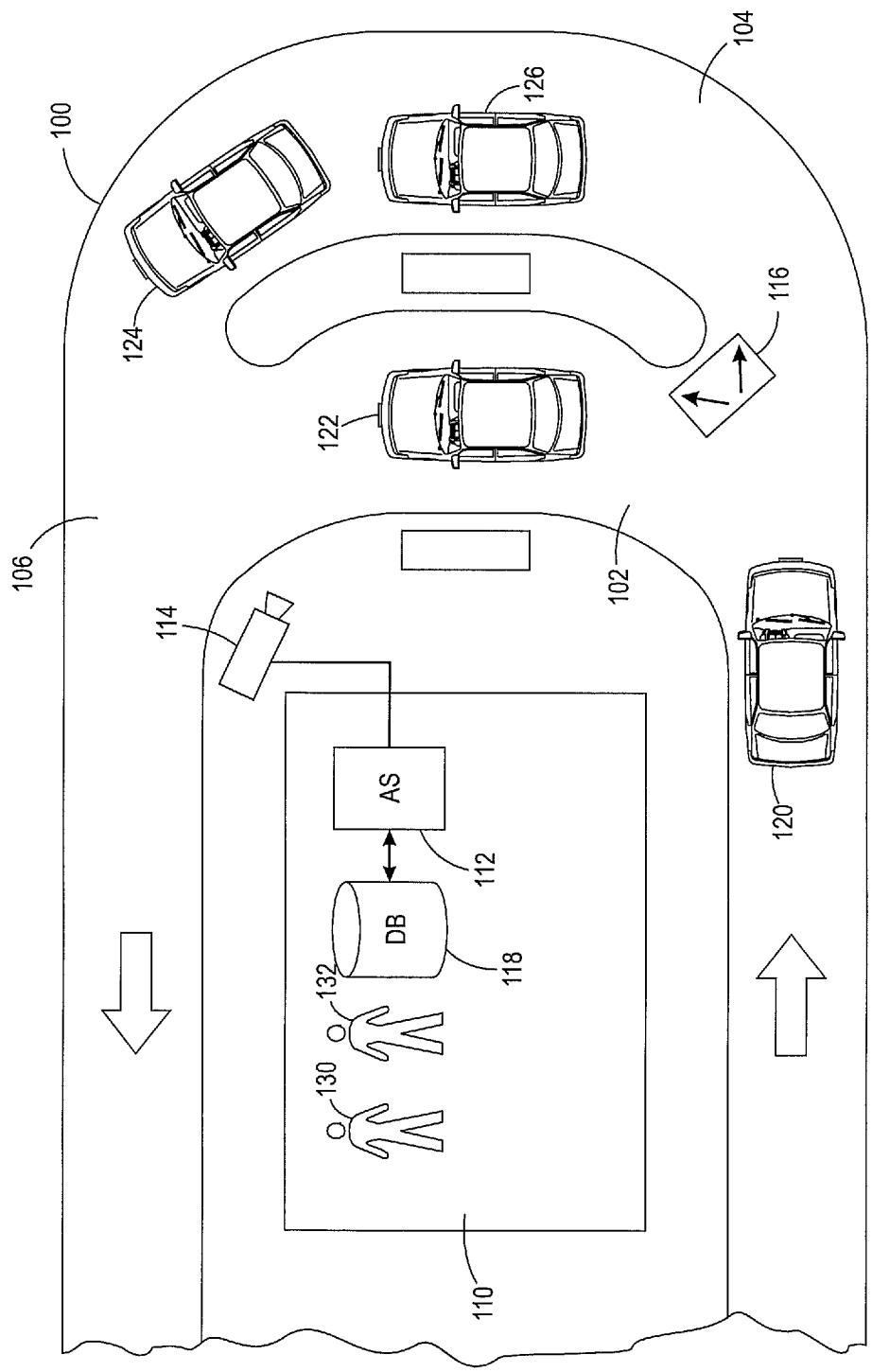
FIG. 1 illustrates an example system for load balancing a drive-thru having a two-lane side-by-side configuration.

FIG. 1 illustrates an example top view of a drive-thru 100 having a two-lane side-by-side configuration of a restaurant 110. In one embodiment, the drive-thru 100 may have a first lane 102 and a second lane 104. Although FIG. 1 illustrates a drive-thru 100 having two lanes, it should be noted that the drive-thru 100 may have two or more lanes. Two lanes are used in FIG. 1 for ease of explanation and should not be considered limiting.

The first lane 102 may also be referred to as an inner lane or a left lane. The second lane 104 may also be referred to as an outer lane or a right lane. The drive-thru 100 may also include a merge point 106 where cars or vehicles, such as cars or vehicles 120, 122, 124 and 126 merge from the first lane 102 and the second lane 104. The term "cars" or "vehicles" are used herein to refer broadly to any type of vehicle such as, for example, a sedan, a truck, a sport utility vehicle (SUV), a motorcycle, a bicycle, and the like. In addition, the present disclosure may be applied to other retailers other than a restaurant. For example, a grocery store may have side-by-side order pick-up lanes for loading pre-ordered groceries, and the like.

In one embodiment, the drive-thru lanes 102 and 104 may be monitored by a video camera 114. In one embodiment, the video camera 114 may be a standard red, green, blue (RGB) video camera with a 1280×720 pixel resolution and a frame rate of 30 frames per second (fps). In another embodiment, a video graphics array (VGA) video camera with a 640×480 pixel resolution and a frame rate of 15 fps may be used.

In one embodiment, the video camera 114 may send video images to an application server (AS) 112. The video camera 114 may be in communication with the AS 112 via a wired or wireless connection. In one embodiment, the AS 112 may be located inside the restaurant 110 or another remote location.

In another embodiment, the entrance of the drive-thru 100 may include a sensor. When the sensor is triggered, a signal may be sent to the AS 112, which in turn sends a signal to the video camera 114 to capture an image of the car 120 that is entering the drive-thru 100. The sensor may be an inductive loop, a laser trigger, a light curtain, and the like. As a result, the video camera 114 may not need to continuously monitor and capture video images of the entrance of the drive-thru 100, which may save processing and memory used to store the video images.

In another embodiment, geo fencing may be used to detect when the car 120 is approaching the drive-thru 100. For example, a customer in the car 120 may download and execute a mobile application of the restaurant 110 on the customer's mobile endpoint device. The customer may order online via the mobile application and grant permission for location services to be enabled on the mobile endpoint device of the customer. Thus, the mobile endpoint device may provide location information to the AS 112 to allow the AS 112 to detect when the car 120 is about to enter the drive-thru 100. When the car 120 is detected near the drive-thru 100, the AS 112 can signal the video camera 114 to capture one or more video images of the vehicle 120.

In one embodiment, a broadcasting module 116 may be located at an entrance of the drive-thru 100. In one embodiment, the broadcasting module 116 may be a display that indicates to the entering car 120 which lane the car 120 should enter. For example, the broadcasting module 116 may display a right arrow and a left arrow, a light indicating which lane the car should enter, words indicating "right lane" or "left lane," and the like. In addition, or alternatively, the broadcasting module 116 may include an estimated overall wait time for the each lane.

In one embodiment, the broadcasting module 116 may be in communication with the AS 112 via a wired or wireless connection. The AS 112 may make a recommendation based upon an estimated order time that is calculated based on analysis of video images received from the video camera 114 and previously estimated order times for each vehicle already in the drive-thru 100. The AS 112 may send the broadcasting module 116 the appropriate recommendation and the broadcasting module 116 may display the corresponding recommendation to the entering car 120.

In one embodiment, the AS 112 may calculate an estimated order time for the car 120 entering the drive-thru 100 based on an analysis of the video images captured by the video camera 114. In one example, video images may be analyzed to determine a size of the vehicle or a class of the vehicle. As noted above, in one embodiment, the order time may be defined as the duration of time to receive an order the car 120. For example, for the embodiment related to a drive-thru restaurant, the order may be a food order, drink order or a combination of both. In another example, for the embodiment of a grocery store, the order may be a product pick up time, and the like.

In another example, the AS 112 may count a number of people inside the car 120. In addition, the AS 112 may estimate an age of the people in the car. For example, the video may be analyzed to determine whether the person is a child or an adult using a binary classifier. In another example, the person may be classified as a child or an adult based on where the person is located inside the car 120 (e.g., back seat versus front seat).

In another embodiment, the AS 112 may obtain a license plate number of the car 120 based on analysis of the video images. The license plate number may be correlated to a customer that is a frequent visitor of the restaurant 110.

Examples of video analysis algorithms to detect a vehicle type, a license plate number, or size and a vehicle occupancy may include U.S. patent Ser. No. 13/215,401 filed on Aug. 23, 2011, Ser. No. 13/677,548 filed on Nov. 15, 2012, Ser. No. 13/312,318 filed on Dec. 6, 2011, Ser. No. 12/476,334 filed on May 21, 2012, Ser. No. 13/416,436 filed on Mar. 9, 2012, U.S. Ser. No. 13/963,472 filed on Aug. 9, 2013, Ser. No. 13/914,752 filed on Jun. 11, 2013, each assigned to Xerox® Corporation and each incorporated by reference in its entirety.

In one embodiment, a database (DB) 118 may store the video images that are captured by the video camera 114. In addition, the DB 118 may store historical order data that may be used to calculate the estimated order time based on the analysis of the video images performed by the AS 112. For example, the historical order data may include an average order size for different car sizes, different class types of a vehicle, different makes and models of cars, and the like.

The average order size may include a typical order that includes different food items that are typically ordered for a particular car size, car class, and/or a make and model. The DB 118 may contain an estimated time to prepare each food item that the restaurant 110 prepares. Based on the typical order, the AS 112 may calculate an estimated order time for the car 120. In one embodiment, the AS 112 may calculate an estimated wait time for the car entering the drive-thru 100 based on the average order size and the estimated time to prepare each food item.

The historical order data may also include an average order size based on different types of individuals (e.g., an adult or a child). The average order size may include a typical order for an adult or a child. The typical order for different types of individuals may be used to estimate an order time and to estimate a wait time based on the estimated time to prepare each food item.

In another example, the historical data may include typical orders for regular customers. For example, the DB 118 may keep track of cars that visit the restaurant 110 based on the license plate number identified in the analysis of the video images. In another example, customers may sign up for a loyalty program, card, or club of the restaurant 110 and provide personal information and permission to track the customers' orders using the customers' license plate. In another example, the customer may provide a typical order when signing up for the loyalty, program, card, or club. In another embodiment, each time the customer visits the restaurant 110, the order history for the customer may be tracked. As a result, when the customer is identified based on the license plate number, the order history for the customer may be used to calculate the estimated order time.

In another example, as discussed above, the customer may use a mobile application to enter an order before arriving at the drive-thru 100 of the restaurant 110. As a result, the estimated order time may be negligible since the order was received in advance.

In one example, the estimated order time may be calculated for each car 122, 124 and 126 that has entered the drive-thru 100. The estimated order time for each car 122, 124 and 126 may be used to calculate an overall estimated wait time for the first lane 102 and the second lane 104. For example, the estimated order time for each car in the first lane 102 may be added together to calculate the first lane overall estimated wait time and the estimated wait time for each car in the second lane 104 may be added together to calculate the second lane overall estimated wait time.

In one embodiment, the overall estimated wait time may represent the estimated wait time before the car 120 entering the drive-thru 100 can place an order. In another embodiment, the overall estimated wait time may represent the estimated wait time before the car 120 will receive his or her order based on the estimated order times of the cars 122, 124 and 126 that have already entered the drive-thru 100 and the estimated food preparation times for the average order size determined for the cars 122, 124 and 126.

The car 120 may then be directed to the first lane 102 or the second lane 104 based on the estimated order time of the car 120 and the previously estimated order time for each one of the plurality of cars 122, 124 and 126 already in the first lane 102 and the second lane 104. In one example, the car 120 may be directed based on which lane 102 or 104 has the shortest overall estimated wait time. For example, if the first lane overall estimated wait time was less than the second lane overall estimated wait time, the car 120 may be directed to the first lane 102 via the broadcasting module 116. The broadcasting module 116 may also display the first lane overall estimated wait time to the car 120.

In another example, the restaurant may wish to deploy one of the lanes 102 or 104 as a "fast lane." For example, the second lane 104 may be used as the "fast lane" that processes cars that have small orders. In one example, if the estimated order time for the car 120 is below a threshold (e.g., less than one minute, less than 30 seconds, and the like), the car 120 may be directed to the second lane 104 even though it may appear that the second lane 104 has more cars than the first lane 102. For example, some cars may only have a single customer (e.g., the driver) and may be estimated to order just coffee (e.g., based on a time of day). Thus, the estimated order time may be approximately 30 seconds to prepare the coffee, which may be below a threshold of one minute. The second lane 104 may have five cars and the first lane 102 may have two cars. Thus, even though the first lane has fewer cars, the car 120 may be directed to the "fast lane" of the second lane 104.

Figure 2:
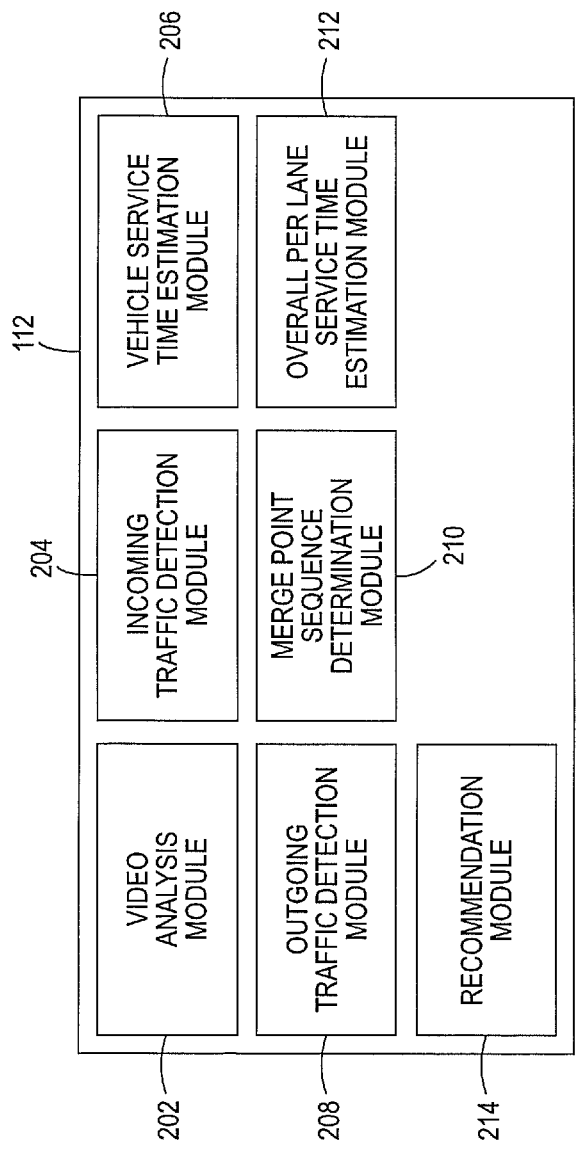
FIG. 2 illustrates an example of modules that perform the calculation of an estimated order time for a vehicle and directing the vehicle.

FIG. 2 illustrates one embodiment of the AS 112. In one embodiment, the AS 112 may include a video analysis module 202, an incoming traffic detection module 204, a vehicle service time estimation module 206, an outgoing traffic detection module 208, a merge point sequence determination module 210, an overall per lane service time estimation module 212 and a recommendation module 214. Although, FIG. 2 illustrates the modules 202, 204, 206, 208, 212 and 214 as separate modules, all of the modules 202, 204, 206, 208, 212 and 214 may be deployed as one or more combination of modules or a single module. The AS 112 may also include other modules and interfaces, such as a computer-readable memory and a processor, similar to the computer 400 described below and illustrated in FIG. 4.

In one embodiment, the video analysis module 202 may analyze the video images received from the video camera 114. In one embodiment, the video analysis module 202 may analyze a region of interest (e.g., two regions of interest including a first lane 102 and a second lane 104) to identify pixels in the video image as car and identification information about each car, such as a type of car, a type of class of the car, a number of people inside of the car, an age of the people inside of the car, a license plate number, a make and model of the car, and the like. The information parsed from the analysis of the video images may be used by the remaining modules to perform each respective function.

In one embodiment, the video analysis module 202 may use any available video analysis. Examples of video analysis algorithms that can be used include automatic license plate recognition, algorithms that detect cars, or vehicles, based upon a sustained presence of motion across a corresponding region of interest, a temporal frame differencing followed by morphological operations, background estimation and subtraction, and the like. Examples of video analysis algorithms may also be found in U.S. patent Ser. No. 13/453,245, filed on Apr. 23, 2012, Ser. No. 13/768,883, filed on Feb. 15, 2013, Ser. No. 13/364,768 filed on Feb. 2, 2012, Ser. No. 14/017,360 filed on Sep. 4, 2013, Ser. No. 13/973,330 filed on Aug. 22, 2013, and U.S. Pat. No. 8,401,230 issued on Nov. 29, 2012, each assigned to Xerox® Corporation and each incorporated by reference in its entirety.

In one embodiment, the incoming traffic detection module 204 may detect and count the number of cars entering each lane 102 and 104 of the drive-thru 100. For example, based on the identification of one or more cars of the video image by the video analysis module 202, the incoming traffic detection module 204 may detect each incoming car in each lane 102 and 104. In addition, the incoming traffic detection module 204 may track the information associated with each car that enters the lanes 102 and 104 obtained by the video analysis module 202.

In another embodiment, the incoming traffic detection module 204 may detect and count the incoming traffic in each lane 102 and 104 using a sensor placed at the entrance of each lane 102 and 104 that is in communication with the incoming traffic detection module 204 in the AS 112. Each time the sensor detects a car, a signal may be sent to the incoming traffic detection module 204 for lane 102 or 104 and the AS 112. The AS 112 may then send a signal to the video camera 114 to capture one or more video images of the car that are used by the video analysis module 202. The sensor may be an electronic sensor, a motion sensor, a light curtain sensor, a pressure sensor, an inductive loop sensor, and the like.

In one embodiment, the vehicle service time estimation module 206 may calculate an estimated order time for a vehicle. For example, based on historical order data and the type of information collected by the video analysis module 202, the vehicle service time estimation module 206 may calculate the estimated order time for a vehicle. As discussed above, the estimated order times may be based on an average order obtained from the historical order data for a type of vehicle, a class of vehicle, a number of people in the vehicle, a customer identified based on a license plate number of the vehicle, an order received in advance via a mobile application, and the like.

In one embodiment, the outgoing traffic detection module 208 may be optional. The outgoing traffic detection module 208 may be unnecessary if a car cannot escape either the first lane 102 or the second lane 104 of the drive-thru 100. For example, the first lane 102 may be surrounded by an order window and a curb of the second lane 104 and the second lane 104 may be surrounded by an order window and another curb or wall.

However, in some drive-thru locations, the second lane 104 may be adjacent to a parking lot or open area where the car 126 in the second lane 104 may simply leave the queue and drive away. Thus, the outgoing traffic detection module 208 may count each time the video analysis module 202 detects a car leaving the region of interest in the video image. In addition, the outgoing traffic detection module 208 may track the information associated with each car that leaves obtained by the video analysis module 202.

In one embodiment, the merge point sequence determination module 210 may detect cars as they leave each lane through the merge point 106. For example, based upon identification of one or more cars of the video image by the video analysis module 202, the merge point sequence determination module 210 may count each car leaving each lane 102 and 104 via the merge point 106. In addition, the merge point sequence determination module 210 may be used for correct sequencing of orders as cars pull to the drive-thru window to pay for and receive their order.

In one embodiment, the incoming traffic detection module 204, the outgoing traffic detection module 208 and the merge point sequence determination module 210 can be implemented by a single video-based vehicle tracking module that detects vehicles when they enter one of the order lanes 102 or 104, and tracks them or determines their trajectory as they traverse the lane and exit it via the merge point 106 or other exit points.

In one embodiment, the overall per lane service time estimation module 212 may be used to determine the overall estimated wait time in each lane 102 and 104 based upon the estimated order time that was calculated for each vehicle by the vehicle service time estimation module 206. In one embodiment, the overall estimated wait time may indicate how long before the car 120 entering the drive-thru can place an order. In another embodiment, the overall estimated wait time may include a wait time to place an order and receive the order. In one example, the overall estimated wait time may be calculated by adding the estimated order time for each car in each lane 102 and 104, respectively.

In one embodiment, the overall estimated wait time may be adjusted when the outgoing traffic detection module 208 detects a vehicle leaving the first lane 102 or the second lane 104. In one embodiment, the overall estimated wait time may be adjusted when the merge point sequence determination module detects a vehicle exiting the first lane 102 or the second lane 104 to have the vehicle's order processed.

In one embodiment, the recommendation module 214 may make a lane recommendation based upon the estimated order time for the vehicle that is about to enter the drive-thru 100 and the previously estimated order time for each vehicle that is already in the first lane 102 or the second lane 104 of the drive-thru 100. In another embodiment, the recommendation module 214 may make a lane recommendation based only upon the estimated order time for each vehicle that is already in the first lane 102 or the second lane 104 of the drive-thru 100 (e.g. the first lane overall estimated wait time and the second lane overall estimated wait time). In one example, one of the lanes 102 or 104 may be a "fast lane." When the estimated order time for the vehicle that is about to enter the drive-thru 100 is below a threshold, the recommendation module 214 may direct the vehicle to the "fast lane."

In another example, the recommendation may be based on the lane 102 or 104 having a lower overall estimated wait time. For example, if the first lane 102 has a first lane overall estimated wait time that is less than a second lane overall estimated wait time of the second lane 104, then the recommendation module 214 may direct the vehicle to the first lane.

In one embodiment, if the lanes 102 and 104 are balanced, the recommendation module 212 may make no recommendation. In other words, the car 120 may be free to choose either lane 102 or 104.

In one embodiment, the recommendation module 214 may also send a signal to the broadcasting module 116. As a result, the broadcasting module 116 may direct the vehicle by displaying the proper recommendation to an incoming car so that the car may select the fastest drive-thru lane between the lanes 102 and 104. In one example, the recommendation module may also display the overall estimated wait time associated with the lane 102 or 104 that the vehicle is directed to.

In another embodiment, the recommendation module 214 may send a signal to a user endpoint device, e.g., a smart phone, a tablet computer, and the like. For example, each user may download an application on his or her endpoint device for receiving the recommendation from the recommendation module 214 when the application detects the user is located at a drive-thru of the restaurant via a global positioning system (GPS) signal of the endpoint device.

Figure 3:
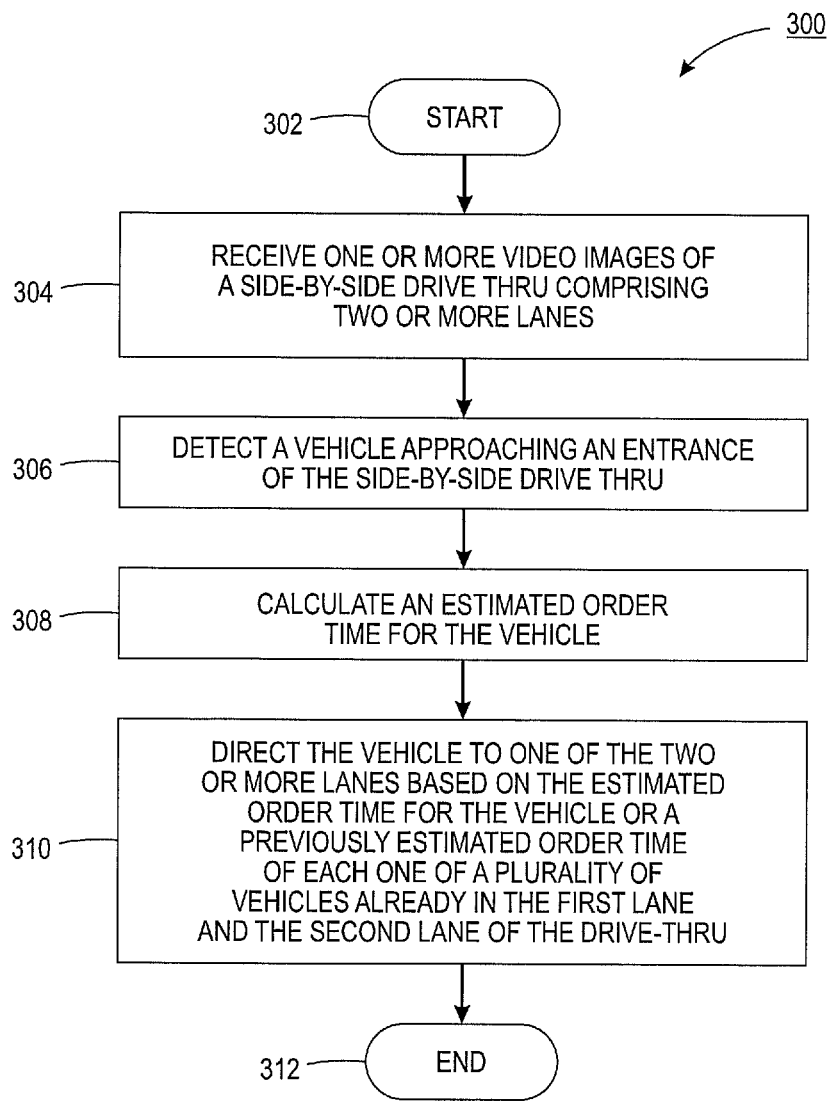
FIG. 3 illustrates an example flowchart of a method for directing a vehicle to a lane of a side-by-side drive-thru.
Figure 4:
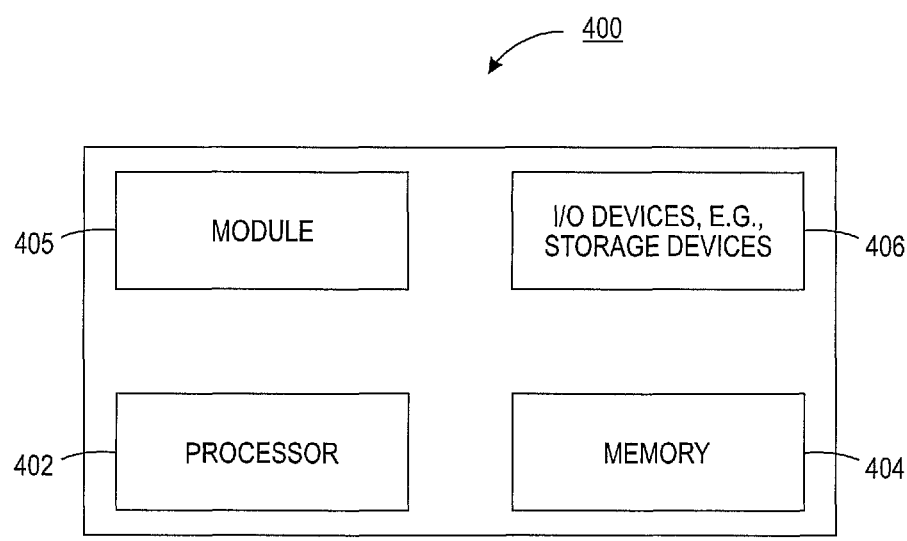
FIG. 4 illustrates a high-level block diagram of a computer suitable for use in performing the functions described herein.

FIG. 3 illustrates a flowchart of an example method 300 for directing a vehicle to a lane of a side-by-side drive-thru. In one embodiment, the side-by-side drive-thru may be a drive-thru at a restaurant having a side-by-side configuration. In one embodiment, one or more steps or operations of the method 300 may be performed by the AS 112 or a computer as illustrated in FIG. 4 and discussed below.

The method 300 begins at step 302. At step 304, the method 300 receives one or more video images of a side-by-side drive-thru comprising two or more lanes. In one example, the drive-thru may comprise a first lane and a second lane. In one embodiment, one or more video cameras may monitor a drive-thru to capture video images of cars that are approaching the drive-thru, in one of the lanes of the drive-thru, exiting the drive-thru, and the like.

In one embodiment, the drive-thru may be for a restaurant. In another embodiment, the drive-thru may be for a grocery store or other retail establishments that use a drive-thru to pick up orders placed in advance. For example, the drive-thru may be lanes of a loading area for order pick up.

At step 306, the method 300 detects a vehicle approaching an entrance of the side-by-side drive-thru. In one embodiment, the one or more video images may include video images of the entrance to the side-by-side drive-thru. The video images may be analyzed to detect the vehicle.

In another embodiment, the vehicle may be detected using a sensor (e.g., a laser, a light curtain, inductive loop, and the like). The sensor may then send a single to an application server in the restaurant, which may then send a single to the video camera to capture the one or more images. In other words, it should be noted that in some embodiments, step 306 may occur before step 304.

At step 308, the method 300 calculates an estimated order time for the vehicle. In one embodiment, the one or more video images may be analyzed to determine information contained in the one or more video images that can be used to calculate the estimated order time for the vehicle.

In one embodiment, the video images may be analyzed to determine a size of the vehicle or a class of the vehicle. In another embodiment, the video images may be analyzed to count a number of people inside the vehicle. The video images may also be analyzed to estimate an age of the people in the vehicle. In one embodiment, the age may be a binary classification (e.g., an adult or a child).

In one embodiment, the video images may be analyzed to determine a license plate number of the vehicle. The license plate number may be correlated to a customer who is a frequent visitor of the restaurant. In one embodiment, the video images may be analyzed to determine any combination of a type of car (e.g., a make and a model), a class of car (e.g., a commercial class, a sedan, a sport utility vehicle (SUV), a truck, a compact, and the like), a number of people in the car, and the like.

Examples of video analysis algorithms to detect a vehicle type, a license plate number, or size and a vehicle occupancy may include U.S. patent Ser. No. 13/215,401 filed on Aug. 23, 2011, Ser. No. 13/677,548 filed on Nov. 15, 2012, Ser. No. 13/312,318 filed on Dec. 6, 2011, Ser. No. 12/476,334 filed on May 21, 2012, Ser. No. 13/416,436 filed on Mar. 9, 2012, U.S. Ser. No. 13/963,472 filed on Aug. 9, 2013, Ser. No. 13/914,752 filed on Jun. 11, 2013, each assigned to Xerox® Corporation and each incorporated by reference in its entirety.

In one embodiment, the information obtained from analysis of the video images may be correlated to historical order data that is stored in a database of the restaurant. The historical order data may include a typical order for a particular type of vehicle, a particular class of vehicle, an adult, a child, a particular adult in a particular type of vehicle, a child in a particular type of vehicle, and the like. In one embodiment, the historical order data may keep track of regular customers and generate a profile of a typical order for regular customers. In one embodiment, all customers' orders may be tracked over time based on a license plate number. The historical order data may be compiled based on previous orders placed over a period of time (e.g., the past year, the past 6 months, and the like).

The database may also store a table that contains an estimated time to prepare each food item that can be prepared by the restaurant. As a result, the estimated order time and the estimated food preparation time may be used to calculate an overall estimated wait time for each lane.

In another example, the customer may place an order in advance using a mobile application on an endpoint device of the customer. The order may include a license plate number of the customer's vehicle. As a result, the customer's vehicle may be identified based on the license plate number read for analysis of the video images. When the customer's vehicle is identified, the estimated order time may be considered to be negligible or zero since the order was placed in advance. In one embodiment, where the overall estimated wait time includes when the vehicle will receive the order, the order can be used with the estimated times to prepare each food item to calculate the overall estimated wait time for the lane the vehicle enters in the drive-thru.

As noted above, the drive-thru may be for order pick up location of a grocery store or other retail establishments. As a result, the estimated order time may be calculated based upon an estimated order processing time that may include an estimated time to locate, carry and place an item into a customer's vehicle.

At step 310, the method 300 directs the vehicle to one of the two or more lanes based on the estimated order time for the vehicle or a previously estimated order time of each one of a plurality of vehicles already in the first lane and the second lane of the drive-thru. In one example, the vehicle may be directed based on which lane has the shortest overall estimated wait time. For example, if the first lane overall estimated wait time was less than the second lane overall estimated wait time, the vehicle may be directed to the first lane via the broadcasting module. The broadcasting module may also display the first lane overall estimated wait time to the vehicle.

In another example, the restaurant may wish to deploy one of the lanes as a "fast lane." For example, the second lane may be used as the "fast lane" that processes cars that have small orders. In one example, if the estimated order time for the vehicle is below a threshold (e.g., less than one minute, less than 30 seconds, and the like), the vehicle may be directed to the second lane even though it may appear that the second lane has more cars than the first lane. For example, some cars may only have a single customer (e.g., the driver) and may be estimated to order just coffee (e.g., based on a time of day). Thus, the estimated order time may be approximately 30 seconds to prepare the coffee, which may be below a threshold of one minute. The second lane may have five cars and the first lane may have two cars. Thus, even though the first lane has fewer cars, the vehicle may be directed to the "fast lane" of the second lane. The method 300 then proceeds to step 312 where the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application.

FIG. 4 depicts a high-level block diagram of a computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for directing a vehicle to a lane of a side-by-side drive-thru, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a computer or any other hardware equivalents, e.g., computer readable instructions pertaining to the method(s) discussed above can be used to configure a hardware processor to perform the steps of the above disclosed methods. In one embodiment, the present module or process 405 for directing a vehicle to a lane of a side-by-side drive-thru can be loaded into memory 404 and executed by processor 402 to implement the functions as discussed above. As such, the present method 405 for directing a vehicle to a lane of a side-by-side drive-thru (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of method 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for directing a vehicle in a side-by-side drive-thru, comprising:
    detecting, by a processor, the vehicle approaching an entrance of the side-by-side drive-thru;
    signaling, by the processor, a video camera to capture one or more video images of the vehicle approaching the entrance of the side-by-side drive-thru;
    determining, by the processor, a size of the vehicle and a number of people within the vehicle;
    calculating, by the processor, an estimated order time for the vehicle based upon historical order data for the size of the vehicle and the number of people within the vehicle;
    calculating, by the processor, a first lane estimated overall wait time and a second lane estimated overall wait time based on estimated order times that were previously calculated for vehicles in the first lane and the second lane, respectively;
    directing, by the processor, the vehicle to the first lane or the second lane based on the estimated order time for the vehicle or the first lane estimated overall wait time and the second lane estimated overall wait time via a broadcasting module; and
    causing, by the processor, the broadcasting module to display the first lane estimated overall wait time when the vehicle is directed to the first lane or the second lane estimated overall wait time when the vehicle is directed to the second lane.

2. The method of claim 1, wherein the determining is based on analysis of the one or more video images that are captured.

3. The method of claim 1, wherein the directing is based upon a shorter overall estimated order time between the first lane and the second lane.

4. The method of claim 1, wherein the directing is based on the estimated order time for the vehicle when the first lane or the second lane is used as a fast lane.

5. The method of claim 4, wherein the vehicle is directed to the fast lane based on the estimated order time being below a threshold.

6. A non-transitory computer-readable medium storing a plurality of instructions which, when executed by a processor, cause the processor to perform operations for directing a vehicle in a side-by-side drive-thru, comprising:
    detecting the vehicle approaching an entrance of the side-by-side drive-thru;
    signaling a video camera to capture one or more video images of the vehicle approaching the entrance of the side-by-side drive-thru;
    determining a size of the vehicle and a number of people within the vehicle;
    calculating an estimated order time for the vehicle based upon historical order data for the size of the vehicle and the number of people within the vehicle;
    calculating a first lane estimated overall wait time and a second lane estimated overall wait time based on estimated order times that were previously calculated for vehicles in the first lane and the second lane, respectively;
    directing the vehicle to the first lane or the second lane based on the estimated order time for the vehicle or the first lane estimated overall wait time and the second lane estimated overall wait time via a broadcasting module; and
    causing the broadcasting module to display the first lane estimated overall wait time when the vehicle is directed to the first lane or the second lane estimated overall wait time when the vehicle is directed to the second lane.

7. The non-transitory computer-readable medium of claim 6, wherein the determining is based on analysis of the one or more video images that are captured.

8. The non-transitory computer-readable medium of claim 6, wherein the directing is based upon a shorter overall estimated order time between the first lane and the second lane.

9. The non-transitory computer-readable medium of claim 6, wherein the directing is based on the estimated order time for the vehicle when the first lane or the second lane is used as a fast lane.

10. The non-transitory computer-readable medium of claim 9, wherein the vehicle is directed to the fast lane based on the estimated order time being below a threshold.

11. A system for directing a vehicle in a side-by-side drive-thru, comprising:
    a sensor to detect the vehicle approaching an entrance of the side-by-side drive-thru;
    a video camera to capture one or more video images of the vehicle approaching the entrance of the side-by-side drive-thru;
    an application server in communication with the sensor and the video camera, wherein the application server receives a first signal from the sensor when the vehicle is detected and generates a second signal to the video camera to capture the one or more video images of the vehicle in response to the first signal from the sensor, wherein the application server determines a size of the vehicle and a number of people within the vehicle, calculates an estimated order time for the vehicle based upon historical order data for the size of the vehicle and the number of people within the vehicle, calculates a first lane estimated overall wait time and a second lane estimated overall wait time based on estimated order times that were previously calculated for vehicles in the first lane and the second lane, respectively, and generates a third signal to direct the vehicle to the first lane or the second lane based on the estimated order time for the vehicle or the first lane estimated overall wait time and the second lane estimated overall wait time; and a broadcasting module in communication with the application server to receive the third signal wherein the third signal causes the broadcasting module to display the first lane estimated overall wait time when the vehicle is directed to the first lane or the second lane estimated overall wait time when the vehicle is directed to the second lane.

12. The system of claim 11, wherein the application server determines the size of the vehicle and the number of people within the vehicle based on analysis of the one or more video images that are captured.

13. The system of claim 11, wherein the vehicle is directed based upon a shorter overall estimated order time between the first lane and the second lane.

14. The system of claim 11, wherein the vehicle is directed based on the estimated order time for the vehicle when the first lane or the second lane is used as a fast lane.

15. The system of claim 14, wherein the vehicle is directed to the fast lane based on the estimated order time being below a threshold.

* * * * *